R. WALKER.
Vehicle-Springs.

No. 154,731. Patented Sept. 1, 1874.

WITNESSES:

INVENTOR:
R. Walker
BY
ATTORNEYS.

UNITED STATES PATENT OFFICE.

ROBERT WALKER, OF HARRISVILLE, OHIO.

IMPROVEMENT IN VEHICLE-SPRINGS.

Specification forming part of Letters Patent No. 154,731, dated September 1, 1874; application filed July 11, 1874.

*To all whom it may concern:*

Figure 1:
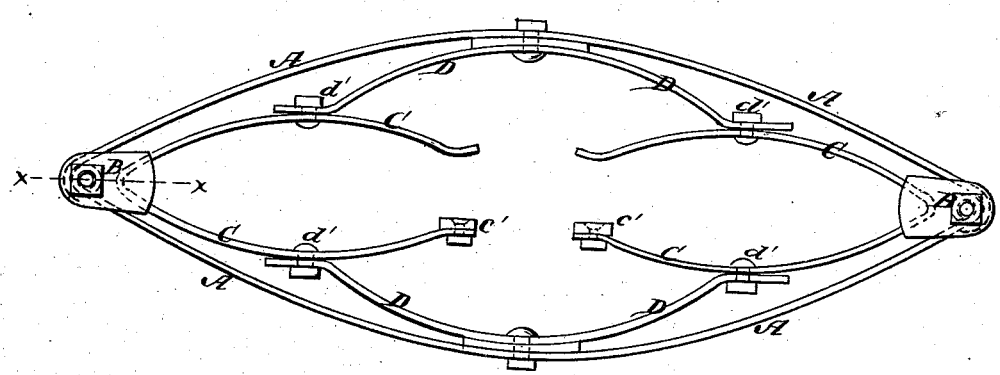
Figure 2:
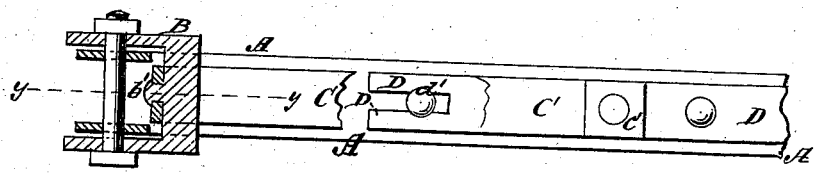
Figure 3:
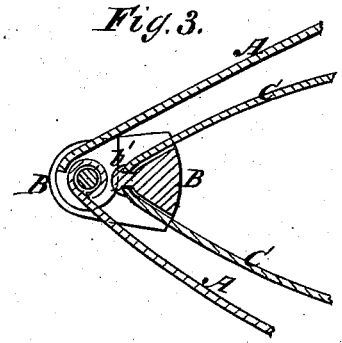

Be it known that I, ROBERT WALKER, of Harrisville, in the county of Harrison and State of Ohio, have invented a new and useful Improvement in Carriage-Springs, of which the following is a specification:

Figure 1 is a side view of my improved spring. Fig. 2 is a detail section of the same, taken through the line $x\ x$, Fig. 1. Fig. 3 is a detail section of the same, taken through the line $y\ y$, Fig. 2.

Similar letters of reference indicate corresponding parts.

My invention has for its object to improve the construction of the carriage-spring for which Letters Patent No. 145,374 were granted to me December 9, 1873, so as to make it simpler in construction, more reliable in operation, and less expensive in manufacture. The invention consists in the curved springs in combination with the open oval springs, and the elliptic spring, and in the yokes, having their inner parts made thinner than their ends, rounded off, and provided with projections, in combination with the elliptic spring, and the oval springs, as hereinafter fully described.

A represents an elliptic spring, the ends of the upper and lower parts of which are connected by yokes or clevises B. C are oval springs, which are open at their inner ends, and are passed around the inner parts of the yokes B. The inner parts of the yokes B are rounded off, and made thinner than their ends so as to form seats for the springs C, to prevent the said springs from being twisted, and from being flattened or pressed together at their bends. Upon the inner parts of the yokes B are formed projections $b'$, to pass through holes in the bends of the oval springs C, to serve as rivets or bolts to keep the said springs in place. To one end of each of the springs C is attached a block, $c'$, for the other end of said spring to strike against. D are curved springs, the centers of which are attached to the centers of the upper and lower parts of the spring A, and the ends of which rest upon the arms of the oval springs C, and are slotted to receive the bolts $d'$, by which they are kept in place laterally, while being allowed to slide longitudinally when the spring is put under pressure.

Having thus described my invention, I claim as new and desire to secure by Letters Patent—

1. The curved springs D, in combination with the open oval springs C, and the elliptic spring A, substantially as shown and described.

2. The yokes B, having their inner parts made thinner than their ends, rounded off, and provided with projections $b'$, in combination with the elliptic spring A, and the oval springs C, substantially as shown and described.

ROBERT WALKER.

Witnesses:
JAMES H. KERR,
H. M. TOLAND.